Aug. 9, 1966 A. H. DAYEM ET AL 3,265,988

SUPERCONDUCTING METALLIC FILM MASER

Filed Aug. 13, 1963 2 Sheets-Sheet 1

INVENTORS: A. H. DAYEM
P. K. TIEN
BY
Sylvan Sherman
ATTORNEY

Aug. 9, 1966 A. H. DAYEM ET AL 3,265,988

SUPERCONDUCTING METALLIC FILM MASER

Filed Aug. 13, 1963 2 Sheets-Sheet 2

3,265,988

SUPERCONDUCTING METALLIC FILM MASER

Aly H. Dayem, Bernards Township, Somerset County, and Ping K. Tien, Chatham Township, Morris County, N.J., assignors to Bell Telephone Laboratories, Incorporated, New York, N.Y., a corporation of New York Filed Aug. 13, 1963, Ser. No. 301,715
5 Claims. (Cl. 331—94)

This invention relates to electromagnetic wave devices and, more particularly, to masers which employ superconducting films to establish the population inversion necessary for stimulated emission.

It is known that electrons will tunnel through a metal oxide barrier between a metal and a superconductor, M(etal)|B(arrier)|S(uperconductor), or between two superconductors S(uperconductor)1|B(arrier) | S(uperconductor)2. The properties of such devices and explanations of their behavior have been recently reported in the literature by numerous workers in the field. (See, for example, "Study of Superconductors by Electron Tunneling" by I. Graever and K. Mergerle, Physical Review, May 15, 1961, page 1101, and "Quantum Interaction of Microwave Radiation With Tunneling Between Superconductors" by A. H. Dayem and R. J. Martin,, Physical Review Letters, March 15, 1962, pages 246 to 248.) It has also been suggested to use such devices for the quantum detection of microwave and sub-millimeter-wave radiation in a manner which is analogous to the detection of visible and near infrared radiation by p-n junctions in semiconductors ("Superconductors as Quantum Detectors for Microwave Sub-Millimeter-Wave Radiation" by E. Burstein, D. N. Langenberg and B. N. Taylor, Physical Review Letters, February 1, 1961, pages 92 to 94).

It is an object of this invention to induce stimulated emission of radiation using superconducting film diodes.

In accordance with the invention, stimulated emission of radiation is effected by means of a composite structure of two superconducting film diodes which share a common element. More specifically, the device comprises three superconducting films, isolated from each other by means of a pair of insulating regions. The result is a multilayer, duodiode structure comprising a first, outer superconducting film, an insulating region, a second, inner superconducting film, a second insulating region and a third, outer superconducting film.

The films are electrically biased so that the inner film is biased positively with respect to one of the outer films and negatively with respect to the other outer film. So biased, electron tunneling is produced between the first outer film and the inner film and between the inner film and the other outer film. The desired radiative process occurs between electrons in the conduction band and vacant states in the valence band of the center film.

The spontaneous emission produced in the above-described device is greatly stimulated to produce a coherent output wave by operating in a suitably tuned resonant structure.

These and other objects and advantages, the nature of the present invention, and its various features, will appear more fully upon consideration of the various illustrative embodiments now to be described in detail in connection with the accompanying drawings, in which.

Figure 1:
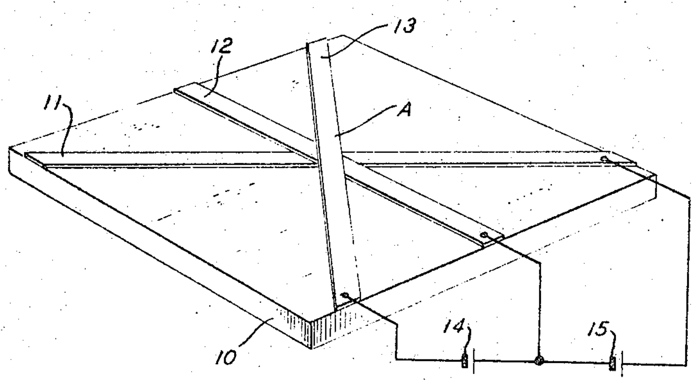
FIG. 1 shows, in perspective, an illustrative embodiment of a superconducting film duodiode in accordance with the invention.

Referring to FIG. 1, there is shown a multilayer, superconducting film duodiode, for use as a maser in accordance with the invention, comprising insulated superconducting film strips 11, 12 and 13. The strips are disposed so as to cross one another at a common intersection A. The device is fabricated by depositing the strips upon a dielectric substrate 10 in sequence. The techniques and processes employed are the same as those employed in the fabrication of superconducting diodes.

Typically, the surface of each strip is oxidized before the next strip is deposited, thus providing the necessary insulation between adjacent strips in the common region A in which the strips cross. Biasing means 14 and 15 are connected at one or both ends of the strips.

Basically, the construction of the multilayer film duodiode is the same as the construction of a simple superconducting film diode with the addition of a second insulating layer and a third superconducting strip. The construction of superconducting film diodes has been extensively described in the literature. (See, for example, "Multiphoton Process Observed in the Interaction of Microwave Fields and the Tunneling Between Superconductor Films," by P. K. Tien and J. P. Gordon, published in The Physical Review, vol. 129, No. 2, pages 647 to 651, January 15, 1963; "Direct Measurement of the Superconducting Energy Gap," by James Nicol, Sidney Shapiro and Paul H. Smith, Physical Review Letters, November 15, 1960.) However, it is recognized that other methods of construction can be used without adversely affecting the operation of the device.

Figure 2:
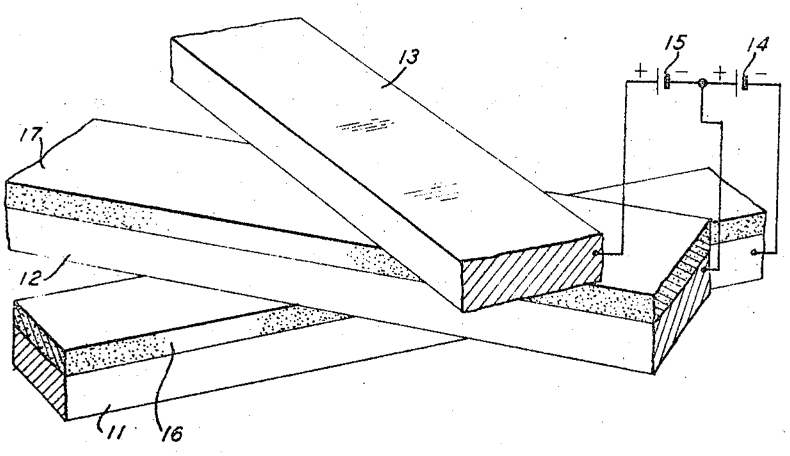
FIG. 2 is a close-up view of the embodiment of FIG. 1, showing the cross-over region of the metallic strips.

FIG. 2 is a close-up view of the device, showing the portion of the films in the cross-over region A. Using the same identification numerals as in FIG. 1, there is shown the first, outer film 11, a first insulating region 16, the second, inner film 12, a second insulating region 17 and the third, outer film 13.

Typically, the films are between 200 A. to 2000 A. thick and about 5 to 20 mils wide. These dimensions, however, are not critical. The insulating region, on the other hand, should be as thin as the technology permits since, as is well known, the tunneling current decreases exponentially with insulator thickness. However, unavoidable imperfection in very thin insulators set the lower limit. A practical range of thicknesses lie between 20 A. and 500 A.

Biasing means 14 and 15 are provided for biasing the films relative to each other. In particular, as shown, the center film 12 is biased positively with respect to outer film 11 and negatively with respect to outer film 13. A typical bias is about one volt.

Figure 3:
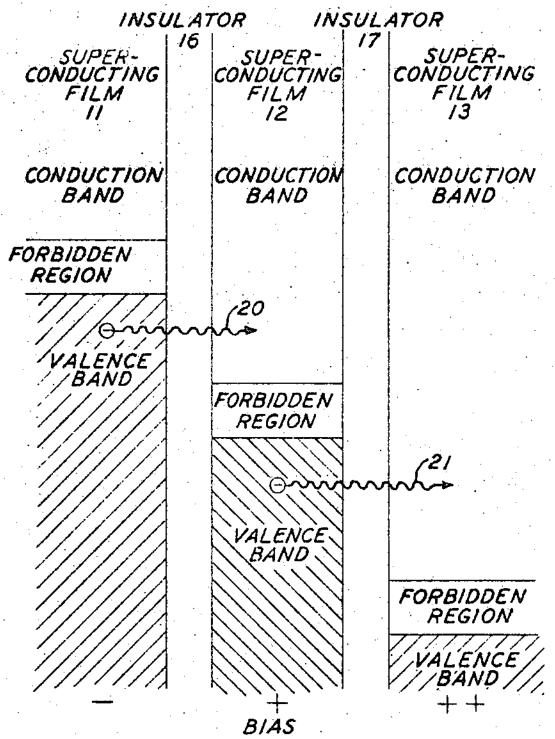
FIG. 3 is an energy level diagram for a superconducting film dudiode in accordance with the invention.

The operation of the device is best explained with reference to the energy level diagram shown in FIG. 3. Assuming, for purposes of discussion, that the films are made of the same superconducting material, the energy diagram for each film is the same. However, because of the biasing, the forbidden regions between the conduction and the valence bands for the three films are displaced relative to each other. Thus, in FIG. 3, the forbidden region of film 12 is displaced so that the energy levels for the upper portion of the valence band of film 11 and the lower portion of the conduction band of film 12 overlap, resulting in electron tunneling through the insulating region 16 from film 11 to 12 as indicated by the wavy line 20.

A similar situation exists with respect to films 12 and 13 resulting in electron tunneling through the insulating region 17 as indicated by the wavy line 21.

As a consequence of the tunneling action, an excess of electrons is established in the conduction band of film 12 and an excess of holes, or vacant states, is established in the valence band of film 12. The desired radiative process occurs when these excess electrons and holes in the center film recombine. This recombination is accompanied by the radiation of energy at a frequency defined by the energy gap of the forbidden region. That is, $$f=\Delta E/h$$

where $f$ is the frequency
$h$ is Planck's constant, and
$\Delta E$ is the energy gap of the forbidden region.

Preferably, the bias applied between the films is as large as possible, without causing breakdown of the insulating film, so as to expose as much of the valence band of one film to the conduction band of the next adjacent film.

Table I, given below, is a tabulation of the transition temperatures, energy gaps, and the corresponding frequencies and wavelengths, for several superconducting metals that can be used to generate wave energy in the millimeter and sub-millimeter range in the manner described.

TABLE I

| Metal | Transition Temperature, ° K. | Gap, ev. $10^{-3}$ | $f$ in $10^9$ c./sec. | $\lambda$ in mm. |
|---|---|---|---|---|
| Pb | 7.193 | 2.165 | 525 | .57 |
| Sn | 3.722 | 1.12 | 271 | 1.11 |
| In | 3.408 | 1.025 | 228 | 1.315 |
| Al | 1.19 | 0.358 | 86.7 | 3.46 |
| Ga | 1.087 | 0.322 | 78 | 3.85 |
| Zn | 0.855 | 0.257 | 62.3 | 4.82 |
| Cd | 0.52 | 0.1565 | 37.8 | 7.95 |

As is characteristic of masers, the emission is stimulated to provide coherent wave energy by locating the device in a high Q cavity tuned to the frequency of emission. The cavity can comprise a pair of near confocal mirrors, of the type useful in the laser art, or it can be a type of cavity conventional to the microwave art.

At the radiation frequency, the center superconductor is slightly negatively conductive and the radiation is guided by the two out superconductors as in a strip transmission line. Hence, the radiation is well guided and focused. Stimulated emission can, therefore, be induced by silvering the edges of the duodiode as is done in the p-n injection diode.

Figure 4:
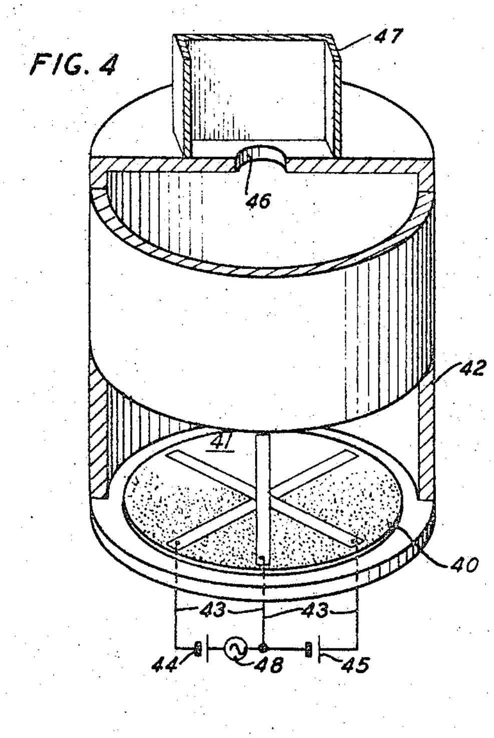
FIG. 4 shows an illustrative embodiment of a maser using a superconducting film duodiode.

FIG. 4, given for purposes of illustration, shows a superconducting film maser using a resonant cavity of the kind conventional in the microwave art. In this embodiment the substrate 40 containing the multifilm structure 41 is placed near one end of a conductively bounded, circular cylindrical cavity 42. Biasing leads 43 are brought out of the bottom of the cavity and connect to the bias sources 44 and 45. At the other end of the cavity there is a coupling aperture 46 through which stimulated electromagnetic energy generated by the duodiode maser is coupled to an output waveguide 47.

Conventional tuning means, not shown, are employed to tune the cavity to the frequency of the radiative energy emitted by the recombining electrons and holes. Also not shown is the refrigeration equipment required to maintain the metallic films in the superconducting state. Such means are well known in the art.

The superconducting maser described herein can be (frequency or amplitude) modulated, if desired, by suitably varying one or more of the circuit parameters. For example, since the width of the forbidden energy gap varies as a function of temperature, varying the temperature of the superconducting center film changes the frequency of the recombination radiation. Accordingly, means for changing the temperature of the duodiode are provided in those situations requiring frequency modulation of the maser.

Amplitude modulation of the maser is achieved, as shown in FIG. 4, by the inclusion of a modulator 48 in series with one of the bias sources. Since the tunneling current is a function of the voltage between adjacent superconducting films, changing the bias in this manner provides a simple means for modulating the amplitude of the output signal derived from the maser.

Thus, it is understood that the above-described arrangement is merely illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:

1. A maser comprising:
a resonant cavity;
a source of radiant energy for energizing said cavity;
said source comprising a multilayer structure including first, second and third conductively insulated superconducting strips;
electrical biasing means for inducing electron tunneling from said first strip to said second strip and from said second strip to said third strip;
and means for tuning said cavity to the frequency corresponding to the forbidden energy gap of said second superconducting strip.

2. The combination according to claim 1 wherein said strips are made of the same metal.

3. The combination according to claim 1 wherein said strips are made of at least two different metals.

4. The maser according to claim 1 including means for changing the temperature of said superconducting strips.

5. The maser according to claim 1 including means for modulating the electrical bias between said second strip and one of said other strips.

References Cited by the Examiner

UNITED STATES PATENTS 3,178,594 4/1965 Pollack ---------- 307—88.5

ROY LAKE, *Primary Examiner.*

D. R. HOSTETTER, *Assistant Examiner.*